Sept. 15, 1959 C. F. ANDERSON ET AL 2,904,631

TELESCRIBING APPARATUS

Filed Dec. 12, 1955 5 Sheets-Sheet 1

INVENTORS
CARL F. ANDERSON
JAMES A. MAIZE
BY
Ellsworth R. Roston
ATTORNEY

TELESCRIBING APPARATUS

Filed Dec. 12, 1955 5 Sheets-Sheet 2

INVENTORS
CARL F. ANDERSON
JAMES A. MAIZE
BY
Ellsworth R. Roston
ATTORNEY

Sept. 15, 1959 C. F. ANDERSON ET AL 2,904,631

TELESCRIBING APPARATUS

Filed Dec. 12, 1955 5 Sheets-Sheet 3

INVENTORS
CARL F. ANDERSON
JAMES A. MAIZE
BY
Ellsworth R. Roston
ATTORNEY

Sept. 15, 1959 C. F. ANDERSON ET AL 2,904,631

TELESCRIBING APPARATUS

Filed Dec. 12, 1955 5 Sheets-Sheet 4

INVENTORS
CARL F. ANDERSON
JAMES A. MAIZE
BY
Ellsworth R. Roston
ATTORNEY

TELESCRIBING APPARATUS

Filed Dec. 12, 1955 5 Sheets-Sheet 5

INVENTORS
CARL F. ANDERSON
JAMES A. MAIZE
BY
Ellsworth R. Roston
ATTORNEY

United States Patent Office 2,904,631

Patented Sept. 15, 1959

2,904,631

TELESCRIBING APPARATUS

Carl F. Anderson, Los Angeles, and James A. Maize, Whittier, Calif., assignors to Telautograph Corporation, Los Angeles, Calif., a corporation of Virginia Application December 12, 1955, Serial No. 552,542

5 Claims. (Cl. 178—19)

This invention relates to telescribing apparatus and more particularly to apparatus for automatically recording at one position information written at another position. The invention is especially adapted to be used for transmitting through telephone lines signals relating to written information.

In our modern complex society, instantaneous communications between different individuals are quite important. Communications by telephone are often sufficient but many times instantaneous communications on a written basis are desirable or even necessary. For example, communications between different branches of a bank often have to be made on such matters as the signatures of clients. Communications are also often required between different plants of a multiplant operation over the signature of an important individual in the multiplant operation.

Telescribing apparatus has been built for instantaneously converting the displacement of a stylus at a transmitting position to electrical signals having characteristics corresponding to the stylus displacements. The signals are then transmitted to a removed position where they are used to control the movements of a recording stylus. In this way, the recording stylus at the receiving position follows the movements of the recording stylus at the transmitting position to obtain a reproduction of the message written at the transmitting position.

Until now, the signals produced at the transmitting position have been modulated in amplitude to represent the various positions of the stylus as the stylus is moved. These amplitude-modulated signals have been transmitted on a wireless basis to the receiving position in a manner similar to the transmission of radio signals. Since the positional information of the stylus has been represented by variations in signal amplitudes, certain problems have arisen as a result of noise and the attenuation of signals as the signals travel through or from the transmitting position to the receiving position. The noise and the attenuation of signals have had a tendency to produce errors in the movement of the stylus at the receiving position relative to the movement of the stylus at the transmitting position.

This invention provides a system for modulating signals by variations in frequency to represent variations in the disposition of a stylus at a transmitting position. The frequency of the signals is varied at any instant from a particular value in accordance with the displacement of the stylus from a zero position. Since the signals are modulated in frequency, problems relating to noise and the attenuation of signals do not arise. The reason for this is that the amplitude of the signals may vary over a wide range without affecting the information represented by the change in signal frequency. Because of the fact that attenuation of the signals does not alter the information being transmitted, the signals may be carried through conventional telephone lines from the transmitting position to the receiving position. This eliminates any necessity for transmitting and receiving equipment other than the equipment already being used by the telephone companies.

The system constituting this invention incorporates certain important features. It includes circuits for insuring that the zero disposition of the stylus at the receiving station is at an extreme position in the movements capable of being traversed by the stylus. It also includes circuits for adjusting the position of the stylus without affecting the reaction of the stylus to the frequency-modulated signals passing through the telephone lines. In this way, the zero position of the stylus at the receiving station can be varied without affecting the simultaneous reaction of the stylus to the frequency-modulated signals. Other features are also included for insuring positive and accurate movements of the stylus at the receiving position in accordance with the movement of the stylus at the transmitting position.

An object of this invention is to provide a system for producing signals having frequencies variable from particular values in accordance with the movements of a stylus at a transmitting position.

Another object of this invention is to provide a system in which the signals representing the movement of the stylus at a transmitting station can be transmitted through telephone lines without any problem of noise or attenuation in the amplitudes of the signals.

A further object is to provide a system in which the movements of a stylus at the receiving station are obtained along a pair of transverse axes from an extreme position such that the initial movements can occur only in a forward direction along the axes.

Still another object is to provide a system in which the static position of a stylus at a receiving station can be adjusted without affecting the dynamic reaction of the stylus to signals representing the movements of a stylus at a transmitting station.

A still further object is to provide a system in which a positive, accurate and reliable control is obtained over the movements of a stylus at a receiving station so that information is properly recorded by the stylus as to messages produced by a stylus at a transmitting station.

Other objects and advantages will be apparent from a detailed description of the invention and from the appended drawings and claims.

Figure 1:
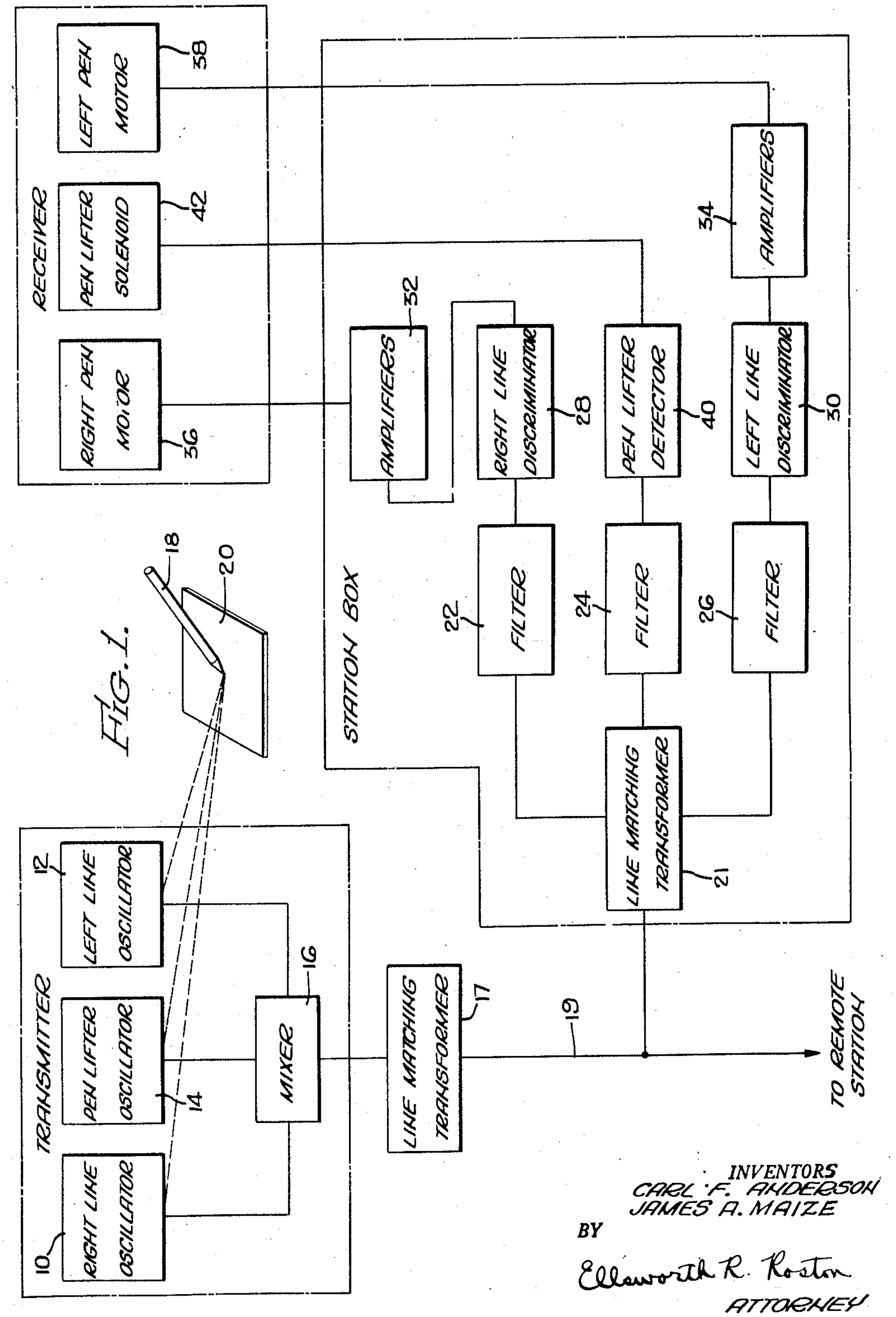
Figure 1 is a block diagram of apparatus at a transmitting station for converting the movements of a stylus at any instant into corresponding frequency modulated signals and of apparatus at a receiving station for decoding the frequency modulated signals to control the positioning of a stylus at the receiving station.

A block diagram of the apparatus constituting this invention is shown in Figure 1. The apparatus includes oscillators 10, 12 and 14 and a mixture 16 which operate in combination with one another at a transmitting station. The oscillator 10 is adapted to provide a suitable frequency such as approximately 2,300 cycles as an intermediate frequency when a stylus 18 has no displacement from a zero position. Means are included in the oscillator 10 to vary the frequency of the oscillator from the central frequency of approximately 2,300 cycles through a range of approximately 50 cycles on each side of the central frequency. The frequency of the oscillator 10 is adapted to be varied when the stylus 18 is displaced along a transverse axis extending from the lower left corner of a writing tablet 20 to the upper right corner of the tablet in Figure 1. The amount by which the frequency varies from approximately 2,300 cycles is related to the displacement of the stylus 18 along the transverse axis. The coupling between the oscillator 10 and the stylus 18 to produce a change in frequency is indicated schematically in Figure 1 by broken lines.

In like manner, the oscillator 12 is adapted to provide a suitable frequency such as approximately 1,700 cycles for a zero displacement of the stylus 18 along a second axis transverse to the first axis. This transverse axis is represented by a line extending from the lower right corner of the tablet 20 to the upper left corner. When the stylus is displaced from the zero position along this axis, the oscillator operates to vary the frequency from 1,700 cycles by an amount dependent upon the displacement. The frequency of the oscillator 12 may vary through a range between approximately 1,650 and 1,750 cycles in accordance with the displacement of the stylus 18 along the transverse axis.

The oscillator 14 is adapted to provide only two frequencies. A first frequency such as approximately 1,300 cycles per second is adapted to be generated by the oscillator 14 when the stylus 18 is not contacting the tablet 20. Signals having a second frequency easily distinguishable from 1,300 cycles per second are generated by the oscillator 14 when the stylus 18 contacts the tablet 20. The second frequency may have a suitable value such as approximately 1,400 cycles per second.

The signals from the oscillators 10, 12 and 14 are linearly mixed in the mixer 16 and are introduced through a line matching transformer 17 to transmission lines such as telephone lines schematically indicated at 19 so that the signals can be transmitted to removed positions. The equipment at one of these removed positions is shown in block form in Figure 1. This equipment includes a line matching transformer 21, the output of which is connected to filters 22, 24 and 26. The signals passing through the filters 22 and 26 are respectively introduced to discriminators 28 and 30 and the output from the discriminators is in turn introduced to amplifiers 32 and 34. The signals from the amplifier 32 control the operation of a motor 36 and the signals from the amplifier 34 control the operation of a motor 38. A detector 40 receives the signals passing through the filter 24 and introduces these signals in a modified form to a solenoid 42.

As the stylus 18 is moved around the tablet 20 to record a message, it varies certain capacitances in the oscillators 10 and 12 in a manner which will be described in detail subsequently. By varying the capacitances in the oscillator 10, the frequency of the signals generated by the oscillator vary. In this way, the frequency of the signals from the oscillator 10 can be made to vary from a central frequency such as approximately 2,300 cycles per second to represent the movements of the stylus 18 along an axis extending from the lower left corner to the upper right corner of the tablet 20.

In like manner, capacitances are included in the oscillator 12 to vary the frequency of the signals from the oscillator in accordance with the movements of the stylus 18. These movements of the stylus 18 occur along an axis extending from the lower right corner to the upper left corner of the tablet 20.

Capacitances are also included in the oscillator 14 to vary the frequency of the signals from the oscillator in accordance with the disposition of the stylus 18 relative to the tablet 20. When the stylus is pressed against the tablet 20, it opens a switch and removes one of the capacitances from the circuit. This causes the oscillator 14 to have a particular frequency such as approximately 1,400 cycles per second. Upon a movement of the stylus 18 away from the tablet 20, the switch becomes closed and the capacitance becomes included in the oscillator circuit. This causes the frequency of the signals from the oscillator 14 to change from approximately 1,400 cycles per second to approximately 1,300 cycles per second. The signals produced by the oscillators 10, 12 and 14 are introduced to the mixer 16 for mixing. The signals then pass to the transformer 17, which provides the signals with an impedance matching that of the telephone line 19. In this way, the signals can be transmitted through the telephone line 19 over long distances with a minimum amount of power loss in the signals.

The transformer 21 receives the signals passing through the line 19 and presents to the signals an impedance corresponding to that of the line 19. By matching the impedance of the transformer 21 to that of the line 19, the transformer is able to pass signals of optimum strength to the filters 22, 24 and 26. The filter 22 has characteristics for passing signals in a range of frequencies between approximately 2,100 and 2,500 cycles per second and to trap signals at all other frequencies. The signals from the filter 22 are introduced to the discriminator 28 which converts the signals into a signal having an amplitude variable above or below a particular value in accordance with the variations in the frequency of the signals above or below the central fraquency of approximately 2,300 cycles per second.

The signals from the discriminator 28 are amplified and introduced to the motor 36. The motor 36 operates in accordance with the amplitude of the signals from the discriminator 28 to drive a stylus 44 (Figures 6 and 7) through a distance dependent upon the amplitude of the signals. The motor 36 drives the stylus 44 along an axis corresponding to the first axis defining the movement of the transmitting stylus 18. In this way, the stylus 44 follows the movements of the stylus 18 on the tablet 20 along an axis extending from the lower left corner to the upper right corner of the tablet.

The filter 26 passes the signals from the transformer 21 only in a range of frequencies from 1,500 cycles to 1,900 cycles per second. These signals are converted by the discriminator 30 to a signal having an amplitude variable from an intermediate value in accordance with the variations in the frequency of the signals from 1,700 cycles per second. The signals from the discriminator 30 are amplified and introduced to the motor 38 to control the operation of the motor in driving the stylus 44 along an axis corresponding to the second axis defining the movement of the transmitting stylus 18. In this way, a movement is imparted to the stylus 44 corresponding to the movement of the stylus 18 along an axis extending from the lower right corner of the tablet 20 to the upper left corner of the tablet.

Figure 6:
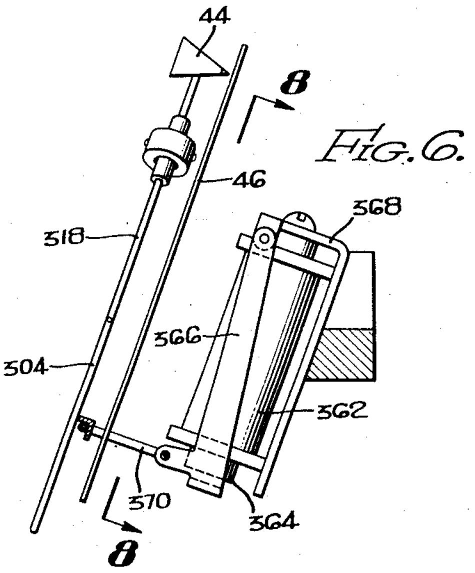
Figure 6 is a sectional view somewhat schematically illustrating the construction of a solenoid schematically shown in Figure 4 and illustrating the construction and relative disposition of certain members associated with the solenoid in the position of the members when the solenoid is energized.
Figure 7:
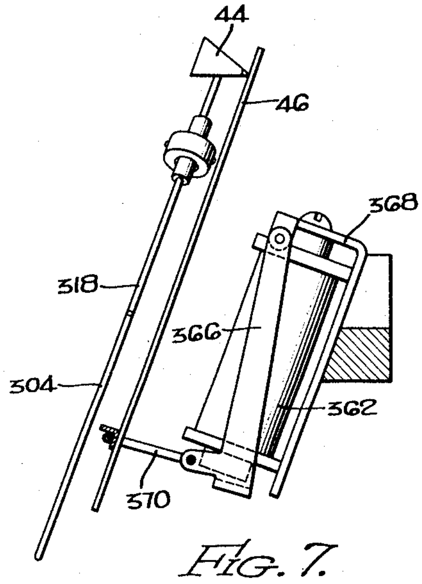
Figure 7 is a view similar to that shown in Figure 6 and illustrates the relative disposition of the members shown in Figure 6 when the solenoid is not energized.

The filter 24 has characteristics for passing signals only at the frequency of 1,300 cycles per second. These signals are sharpened by the detector 40 and are introduced to the solenoid 42 to move the stylus 44 out of contact with a paper 46 (Figures 6 and 7). By energizing the solenoid 42 (Figure 1) only upon the occurrence of signals having a frequency of 1,300 cycles per second, the stylus 44 at the receiving station contacts the paper 46 (Figures 6 and 7) at all times except when the stylus 18 at the transmitting station is positioned away from the tablet 20. In this way, the stylus 44 is able to record messages on the paper 46 at all times that the stylus 18 is contacting the tablet 20 to record messages on the tablet.

Figure 2:
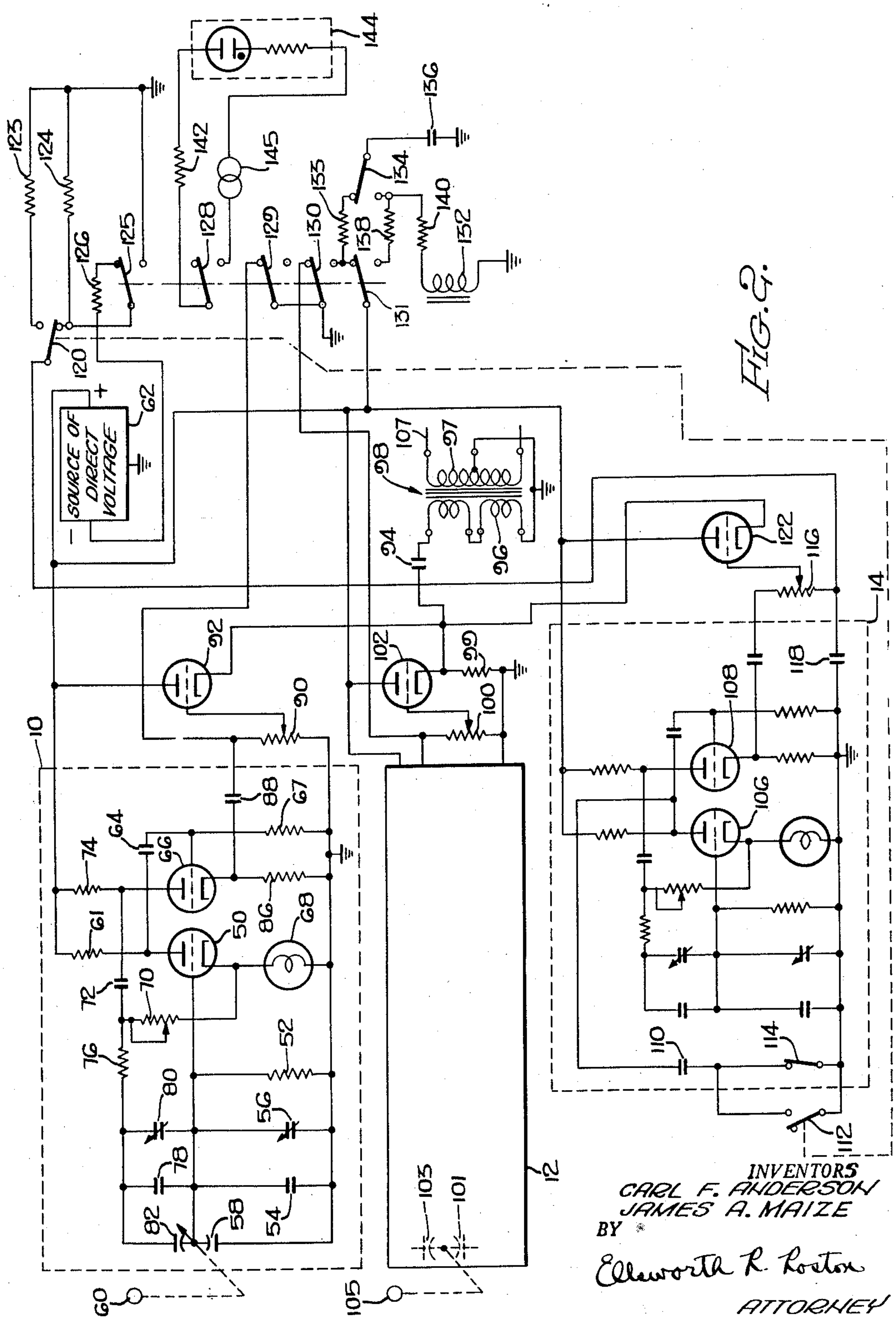
Figure 2 is a circuit diagram, partly in block form, illustrating in detail apparatus for converting the movements of the stylus at the transmitting station into signals having variable frequencies to represent such stylus movements as well as apparatus for controlling the transmission of such signals.
Figure 3:
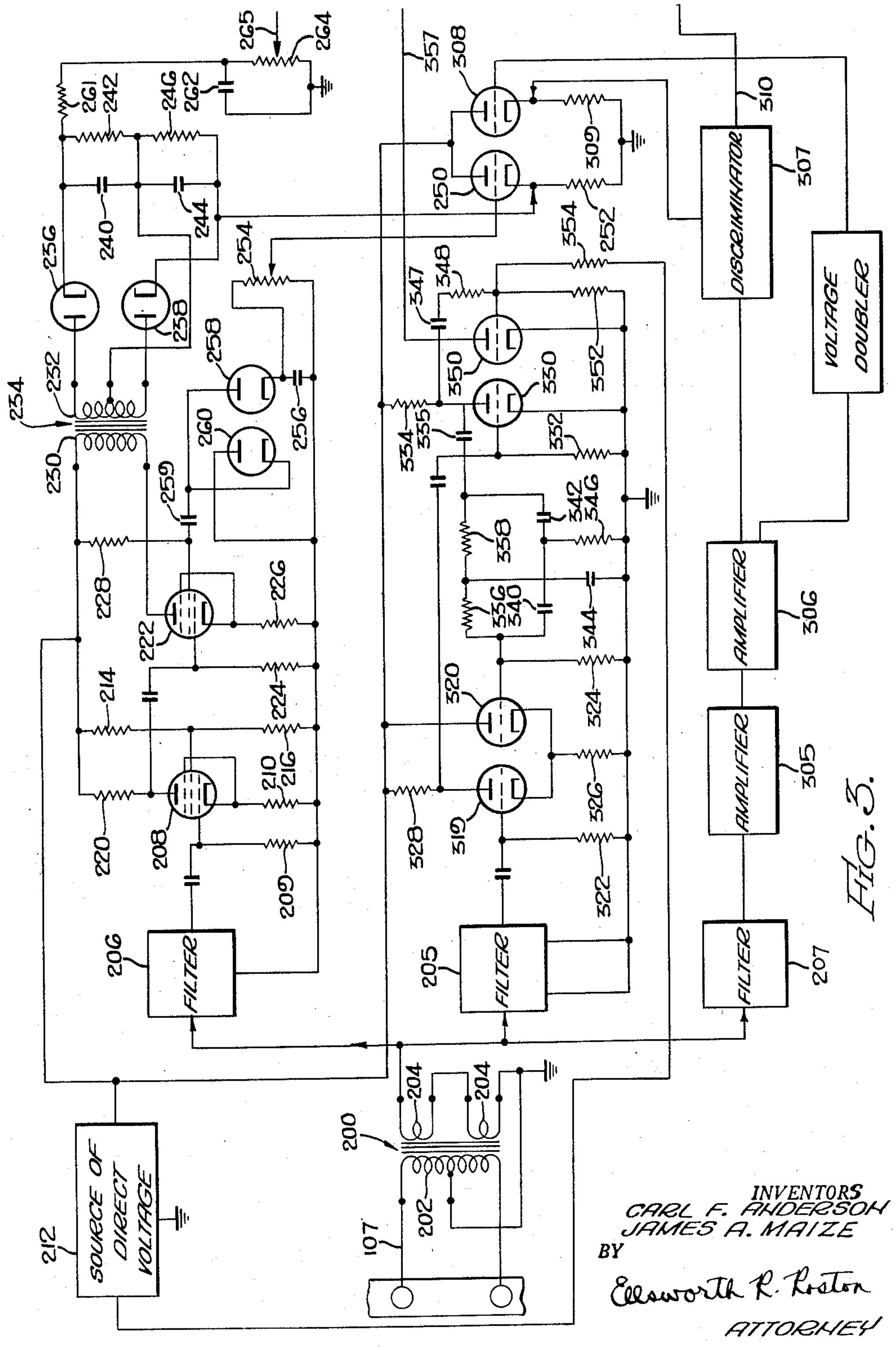
Figure 3 is a circuit diagram, partly in block form, of apparatus for receiving the transmitted signals and for converting the received signals into a form for obtaining the movements of a stylus at the receiving station in accordance with the movements of the stylus at the transmitting station.

Somewhat detailed circuits are shown in Figures 2 and 3 for accomplishing the functions represented by the blocks shown in Figure 1 and described above. These circuits include stages shown in Figure 2 for generating the different signals and mixing the signals for transmission. One of the stages includes a tube 50 having its grid connected to a grounded resistance 52 and a grounded capacitance 54. The resistance 52 and the capacitance 54 may respectively have values such as approximately 110,000 ohms and 800 micromicrofarads.

A capacitance 56 manually variable over a range of 7 to 45 mmf. is also connected between the grid of the tube 50 and ground. Variations in the values of the capacitances connected to the grid of the tube 50 are also obtained from a capacitance 58, one plate of which is rotatable in accordance with the movements of the stylus 18. A linkage 60 is coupled to the rotatable plate of the capacitance 58 at one end and at the other end is disposed in coupled relationship to a second linkage (not shown). The movements of the second linkage are controlled by the stylus 18. The linkage 60 and the second linkage (not shown) correspond to linkages shown in Figure 5 and hereinafter to be described in detail.

A connection is made from the plate of the tube 50 to one terminal of a resistance 61 having a suitable value such as approximately 68,000 ohms. The other terminal of the resistance 61 is connected to a source 62 of direct voltage having regulated characteristics. The plate of the tube 50 is also connected through a suitable coupling capacitance 64 to the grid of a tube 66. A resistance 67 having a suitable value such as approximately 1 megohm extends between the grid of the tube 67 and ground. The tubes 50 and 66 may be included within one envelope and may be of a suitable type such as a type "12AU7."

A regulator tube 68 is connected between the cathode of the tube 50 and ground. The cathode of the tube 50 also has a common connection with one terminal of a rheostat 70 having a suitable value such as approximately 10,000 ohms. A capacitance 72 is connected at one end to the second stationary and movable contacts of the rheostat 70 and at the other end to the plate of the tube 66. Voltage from the source 62 is adapted to be applied to the plate of the tube 66 through a resistance 74 having a suitable value such as approximately 22,000 ohms.

A resistance 76 and a capacitance 78 are in series with the capacitance 72 between the plate of the tube 66 and the grid of the tube 50. The resistance 76 and the capacitance 78 may respectively have values of approximately 110,000 ohms and 800 micromicrofarads. A capacitance 80 is in parallel with the capacitance 78 and is manually adjustable over a suitable range such as approximately 7 to 45 micromicrofarads. A capacitance 82 is also in parallel with the capacitance 78 and is variable over a suitable range such as approximately 7 to 51 micromicrofarads. The capacitance 82 is coupled through the linkage 60 and the second linkage (not shown) to the stylus 18 such that its value varies in accordance with the movements of the stylus in a manner similar to that described above for the capacitance 58.

A resistance 86 having a suitable value such as approximately 1,000 ohms is connected between the cathode of the tube 66 and ground. The voltage on the cathode of the tube 66 is applied through a suitable coupling capacitance 88 to a stationary contact of a potentiometer 90 having a suitable value such as approximately 1 megohm. The other stationary contact of the potentiometer 90 is grounded and the movable contact of the potentiometer is connected to the grid of a tube 92. The movable contact of the potentiometer 90 is manually adjustable in position.

Voltage from the source 62 is applied to the plate of the tube 92 and the alternating signals produced on the cathode of the tube are applied through a suitable capacitance 94 to one terminal of a primary winding 96. The primary winding 96 and a secondary winding 97 are included in a transformer generally indicated at 98. The other terminal of the primary winding 96 is grounded. Signals are produced on the cathode of the tube 92 by connecting the cathode to one terminal of a resistance 99 and grounding the other terminal of the resistance. The resistance 99 may have a suitable value such as approximately 680 ohms.

The stages described above are adapted to produce signals at a suitable frequency such as approximately 2,300 cycles to serve as the oscillator 10 in Figure 1. Similar circuitry may also be provided to serve as the oscillator 12. However, the values of the different components in the oscillator 12 should be changed from those described above so that the oscillator 12 will generate signals at a suitable frequency such as approximately 1,700 cycles. It is believed that a person skilled in the art would understand how to construct the oscillator 12 in accordance with the detailed disclosures being made as to the construction of the oscillator 10. The oscillator 12 has capacitances 101 and 103 respectively corresponding to the capacitances 58 and 82 in the oscillator 10. The capacitances 101 and 103 are coupled to a linkage 105 for variation in accordance with the movements of the stylus 18.

The signals from the oscillator 12 are applied to one stationary contact of a potentiometer 100 corresponding to the potentiometer 90 and having a suitable value such as approximately 1 megohm. The other stationary contact of the potentiometer 100 is grounded. The movable contact of the potentiometer 100 may be manually adjustable in position and is electrically connected to the grid of a tube 102. The tubes 92 and 102 may be included as double triodes within a single envelope such as a "12AU7." The plate of the tube 102 has a positive voltage applied to it from the source 62 and the signals on the cathode of the tube 102 pass through the capacitance 94 to the ungrounded terminal of the primary winding 96. The cathode of the tube 102 also has a common connection with the ungrounded terminal of the resistance 99.

The oscillator 14 is also constructed in a manner similar to that described above in detail for the oscillator 10. It includes a pair of tubes 106 and 108 corresponding respectively to the tubes 50 and 66 in the oscillator 10. A capacitance 110 is connected between the plate of the tube 106 and a first stationary contact of a manually operated single-pole, double-throw switch 112. No electrical connection is made to the second stationary contact of the switch 112 and the movable contact of the switch is grounded. A connection is made from the first stationary contact of the switch 112 to a stationary contact of a single-pole, single-throw switch 114. The movable contact of the switch 114 is grounded. The switch 114 is normally closed and is coupled to the stylus 18 so as to become opened when the stylus is pressed against the tablet 20.

The output signals on the cathode of the tube 108 are applied through a suitable coupling capacitance to a first stationary contact of a potentiometer 116 having characteristics corresponding to those of the potentiometer 90 and 100. A second stationary contact of the potentiometer 100 is connected to one terminal of a capacitance 118 having its other terminal grounded and having a suitable value such as approximately 8 microfarads. The second stationary contact of the potentiometer 116 also has a common connection with the movable contact of a manually operated single-pole, double-throw switch 120 suitably ganged to the switch 112. The movable contact of the potentiometer 116 is manually adjustable and is electrically connected to the grid of a tube 122, which may be provided with characteristics corresponding to those of the tubes 92 and 102. The plate of the tube 122 has a positive potential applied to it from the voltage source 62. The cathode of the tube 122 introduces signals through the coupling capacitance 94 to the ungrounded terminal of the primary winding 96.

A resistance 123 having a suitable value such as approximately 10,000 ohms is connected between ground and the upper stationary contact of the switch 120 in Figure 2. Similarly, a resistance 124 having a suitable value such as approximately 47,000 ohms is connected between ground and the lower stationary contact of the switch 120 in Figure 2. The lower stationary contact of the switch 120 also has a common connection with the movable contact of a single-pole, double-throw switch 125, the lower stationary contact of which is grounded. The upper stationary contact of the switch 125 has a common connection with one terminal of a resistance 126, which may be provided with a suitable value such as approximately 47,000 ohms. The other terminal of the resistance 126 is connected to the voltage source 62 to receive a suitable negative potential such as approximately —150 volts.

The switch 125 and single-pole, double-throw switches 128, 129, 130 and 131 are associated with a solenoid 132 for actuation when the solenoid is energized. The movable contacts of the switches 129 and 130 are grounded. No electrical connection is made to the lower stationary contact of the switch 129 in Figure 2. A connection is made from the upper stationary contact of the switch 129 in Figure 2 to the common terminal between the capacitance 88 and the potentiometer 90. In like manner, the upper stationary contact of the switch 130 in Figure 2 has a common connection with the ungrounded stationary contact of the potentiometer 100.

The movable contact of the switch 131 is adapted to receive a positive potential from the voltage source 62. The upper stationary contact of the switch 131 is connected to one terminal of a resistance 133 and to the lower stationary contact of the switch 130 in Figure 2. The other terminal of the resistance 133 has a common connection with the upper stationary contact of a unison switch 134, which remains actuated only during the time that it is being depressed. A capacitance 136 is connected between the movable contact of the switch 134 and ground. The resistance 133 and the capacitance 136 are respectively provided with suitable values such as approximately 1,200 ohms and 13 microfarads.

A resistance 138 having a suitable value such as approximately 6,800 ohms has common connections at opposite terminals with the lower stationary contacts of the switches 131 and 134 in Figure 2. A resistance 140 and the solenoid 132 are in series between the resistance 138 and ground. The resistance 140 may be provided with a suitable value such as approximately 6,800 ohms.

A resistance 142, a neon light 144 and a source 145 of alternating voltages are in series between the movable and lower stationary contacts of the switch 128 in Figure 2. The resistance 142 may have a value of approximately 180,000 ohms and the neon bulb 144 may be a type "NE-51." No electrical connection is made to the upper stationary contact of the switch 128 in Figure 2.

The tube 50 may be initially conductive such that current flows through a circuit including the voltage source 62, the resistance 61, the tube and the regulator tube 68. The flow of current through the resistance 61 causes a voltage drop to be produced across the resistance and a relatively low voltage to be produced on the plate of the tube 50. This relatively low voltage is introduced through the coupling capacitance 64 to the grid of the tube 66 to make the tube non-conductive. Since the tube 66 is non-conductive, current cannot flow through a circuit including the voltage source 62, the resistance 74, the tube and the resistance 86. Because of the lack of any current flow through the resistance 74, the voltage on the plate of the tube 66 remains at a potential approaching the potential from the voltage source 62.

The relatively high voltage on the plate of the tube 66 produces a flow of current through the parallel combination of the capacitances 78, 80 and 82 and the parallel combination of the resistance 52 and the capacitances 54, 56 and 58. The rate at which current flows is dependent upon the values of the RC time constant provided by the resistances and capacitances. As the capacitances become charged, the current through the resistance 52 tends to decrease. This produces a corresponding decrease in the voltage across the resistance 52 and on the grid of the tube 50. At some time during the decrease of the voltage on the grid of the tube 50, the voltage on the grid of the tube falls below the voltage introduced to the cathode of the tube from the plate of the tube 66. This causes the tube 50 to become non-conductive.

As will be seen, the time required for the tube 50 to become cut off can be adjusted by manually varying the values of the capacitances 56 and 80 or by varying the values of the capacitances 58 and 82 in accordance with the movements of the stylus 18. When the tube 50 becomes cut off, the voltage on the plate of the tube rises to a value approaching the potential from the voltage source 62. This causes a relatively high potential to be introduced to the grid of the tube 66 to make the tube conductive. Current then flows through a circuit including the voltage source 62, the resistance 74, the tube 66 and the resistance 86. This current produces a voltage drop across the resistance 74 such that the voltage on the plate of the tube 66 decreases to a value somewhat less than the potential from the source 62.

Because of the decrease in the voltage on the plate of the tube 66, the capacitances such as the capacitances 78, 80 and 82 are charged to an excessive value. This causes the capacitances such as the capacitances 78, 80 and 82 to discharge through a circuit including the capacitances, the resistance 76, the capacitance 72, the tube 66, the resistance 86 and the resistance 52. The capacitances 78, 80 and 82 also discharge through a circuit including the capacitances, the resistance 76, the rheostat 70, the bulb 68 and the resistance 52. When the capacitances have discharged sufficiently, the potential on the grid of the tube 50 becomes sufficiently positive relative to the potential on the cathode such that the tube 50 once again becomes conductive. This initiates a new cycle of operation.

As will be seen, oscillations are produced by alternately making the tubes 50 and 66 conductive. The oscillations are produced at a frequency dependent upon the RC time constants provided by the series circuit formed by the capacitances 78, 80 and 82 in parallel and by the capacitances 54, 56 and 58 and the resistance 52 in parallel. The oscillations tend to be dampened somewhat by the operation of the rheostat 70, which introduces a feedback voltage to the cathode of the tube 50 to prevent the tube from being driven too hard. In this way, oscillatory signals approaching sine waves are produced by the tubes 50 and 66.

The oscillatory signals introduced to the grid of the tube 66 appear on the cathode of the tube since the tube and the resistance 86 operate as a cathode follower. These signals are introduced through the coupling capacitance 88 to the potentiometer 90, which introduces them to the grid of the tube 92. Current flows through a circuit including the voltage source 62, the tube 92 and the resistance 99 in accordance with the amplitude of the signals introduced to the grid of the tube.

The alternating signals produced across the resistance 99 pass through the capacitance 94 to the primary winding 96 of the transformer 98 and induce corresponding signals in the secondary winding 97 of the transformer. The signals induced in the secondary winding 97 then pass through the telephone lines 107 to various receiving positions. By including the transformer 98 and the cathode follower and mixer formed by the tube 92 and the resistance 99, a match in impedances is obtained between the transformer and the line 107 to provide an optimum transmission of signals.

In like manner, oscillatory signals are introduced to the grid of the tube 102 to represent the positioning of the stylus 18 along an axis extending from the lower right corner of the tablet 20 to the upper left corner of the tablet. The signals are varied in frequency in accordance with the displacement of the stylus 18 along this axis since the capacitances 101 and 103 are coupled to the stylus through linkages including the linkage 105 for variations in value when the stylus moves along the axis. By coupling the cathodes of the tubes 92 and 102 to receive the signals produced in the tubes, the signals can be mixed on a linear basis. In this way, no beat frequency signals or harmonics are produced in the transformer 98.

The frequency of the signals produced in the oscillator 14 is dependent upon the positioning of the switches 112 and 114. When the switches 112 and 114 are open, the capacitance 110 is not in the circuit and the RC time constant of the circuit is sufficiently low for the signals to have a frequency of approximately 1,400 cycles per second. Upon the closure of either the switch 112 or the switch 114, the capacitance 110 is coupled into the circuit.

During the time that the tube 106 is cut off, the capacitance 110 becomes charged when one of the switches 112 and 114 is closed. The capacitance subsequently discharges through the tube 106 when the tube becomes conductive. Because of the charge and discharge of the capacitance 110, the operation of the oscillator 14 becomes slowed down so that the frequency of the signals changes to a value of approximately 1,300 cycles per second. The switch 114 is normally closed so that a frequency of 1,300 cycles per second is produced. When the stylus 18 is pressed against the tablet 20 to record a message, the switch 114 becomes open so that signals at a frequency of 1,400 cycles per second are transmitted.

The transmission of signals through the telephone line 107 is dependent upon the operation of the switch 134 in Figure 2. The switch 134 is spring-loaded so that the movable contact of the switch engages the upper stationary contact except when the movable contact is manually depressed. During the time that the movable contact of the switch 134 engages the upper stationary contact of the switch, current flows through a circuit including the voltage source 62, the movable and upper stationary contacts of the switch 131, the resistance 133, the upper stationary and movable contacts of the switch 134 and the capacitance 136. The current flowing through this circuit charges the capacitance 136 to a potential approaching that from the source 62. Upon a depression of the movable contact of the switch 134 into engagement with the lower contact of the switch, the capacitance 136 discharges through a circuit including the capacitance, the movable and lower stationary contacts of the switch 134, the resistance 140 and the solenoid 132. This causes the solenoid 132 to become energized.

When the solenoid 132 becomes energized, it actuates the movable contacts of the switches 125, 128, 129, 130 and 131 into engagement with the lower stationary contacts of the switches in Figure 2. This causes a holding circuit to be established for maintaining the solenoid 32 energized. This holding circuit includes the voltage source 62, the movable and lower stationary contacts of the switch 131, the resistances 138 and 140 and the solenoid 132. The solenoid 132 remains energized even when the movable contact of the switch 134 is released such that the movable contact of the switch pivots into engagement with the upper stationary contact of the switch.

Upon a release of the movable contact of the switch 134, a continuous circuit is established which includes the capacitance 136, the movable and upper stationary contacts of the switch 134, the resistance 133 and the lower stationary and movable contacts of the switch 130. This causes the capacitance 136 to discharge quickly and completely since the resistance 133 has a relatively low value. The capacitance 136 remains discharged until the movable contact of the switch 134 is again depressed. At such a time, a continuous circuit is established which includes the voltage source 62, the movable and lower stationary contacts of the switch 131, the resistance 138, the lower stationary and movable contacts of the switch 134 and the capacitance 136. This circuit initially has a large value because of the previous discharge of the capacitance 136.

Because of the large flow of current through the capacitance 136, relatively little current is able to flow through the solenoid 132. This current is insufficient to maintain the movable contacts of the switches 128, 129, 130 and 131 in engagement with the lower stationary contacts of the switches. The movable contact of the switch 131 then pivots into engagement with the upper stationary contact of the switch and interrupts the circuit through the switch for energizing the solenoid 132. In this way, the solenoid 132 is energized during the time that the switch 134 is first actuated and until the time that the switch is next actuated.

During the time that the solenoid 132 is not actuated, the movable contacts of the switches 129 and 130 engage the upper stationary contacts of the switches in Figure 2. This causes ground potentials to be applied to the grids of the tubes 92 and 102 to prevent the passage of signals from the oscillators 10 and 12 through the tubes to the primary winding 96. The ground potentials on the grids of the tubes 92 and 102 become removed when the solenoid 132 is energized since the movable contacts of the switches 129 and 130 are pivoted out of engagement with the upper stationary contacts of the switches in Figure 2. Because of this, signals representing the movement of the stylus 18 are introduced to the telephone line 100 only afer a first depression of the unison switch 134 to make the solenoid 132 energized.

During the time that signals representing the movement of the stylus 18 are being produced by the oscillators 10 and 12, the neon bulb 144 is illuminated to indicate the recording of a message. The neon bulb 144 is illuminated by the flow of current through a circuit including the source 145 of alternating voltage, the neon bulb 144, the resistance 142 and the movable and lower stationary contacts of the switch 128 in Figure 2.

Signals from the oscillator 14 are able to pass through the tube 122 to the transformer 98 during the time that the solenoid 132 is being energized and the movable contact of the switch 120 is positioned in engagement with the lower stationary contact of the switch. This results from the fact that the lower stationary contact of the potentiometer 116 in Figure 2 has a substantially ground potential applied to it through a circuit including the movable and lower stationary contacts of the switch 120 and the movable and lower stationary contacts of the switch 125. Since the lower stationary contact of the potentiometer 116 in Figure 2 has a ground potential, the movable contact of the potentiometer receives a potential sufficiently above ground to make the tube 122 conductive.

When the solenoid 132 is not energized, the movable contact of the switch 125 engages the upper stationary contact of the switch in Figure 2. A continuous circuit is established which includes the negative terminal of the voltage source 62, the resistance 126, the movable and upper stationary contacts of the switch 125, the lower stationary and movable contacts of the switch 120 and the potentiometer 116. The continuous circuit from the voltage source 62 to the potentiometer 116 causes a negative potential of approximately —150 volts to be applied to the lower stationary contact of the potentiometer in Figure 2. By applying this negative potential to the potentiometer 116, a sufficiently negative bias is produced on the movable contact of the potentiometer to prevent any oscillatory signals from being produced in the tube 122.

Since the switches 112 and 120 are ganged, the movable contact of the switch 112 moves into engagement with the stationary contact of the switch when the movable contact of the switch 120 is manually pivoted into engagement with the upper stationary contact of the switch. Upon an engagement between the movable and right stationary contacts of the switch 112, signals at a frequency of 1,300 cycles per second are produced by the oscillator 14. By closing the switch 112, signals at a frequency of 1,300 cycles per second are produced even though the switch 114 should become accidentally opened.

The signals from the oscillator 14 pass through the tube 122 to the transformer 98 since the grid of the tube has a positive bias. The grid of the tube 122 has a positive bias applied to it because of the introduction of a ground potential to the lower stationary contact of the potentiometer in Figure 2. The ground potential is applied to the lower stationary contact of the potentiometer 116 through a circuit including the movable and upper stationary contacts of the switch 120 and the resistance 123.

Figure 4:
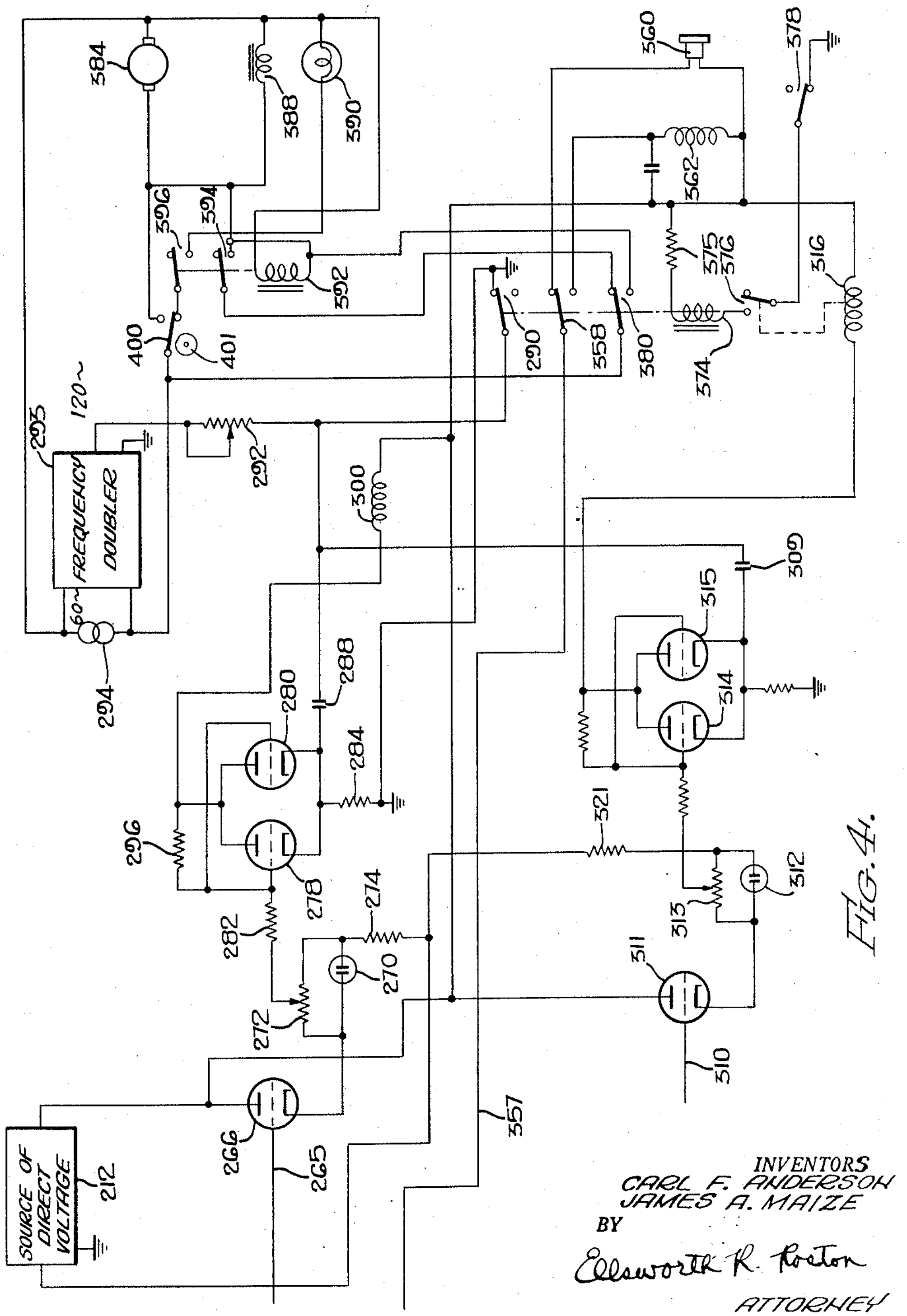
Figure 4 is a circuit diagram of apparatus for using the signals produced by the circuitry shown in Figure 3 to obtain a proper recording of a message by the stylus at the receiving station and for preparing the receiving apparatus for a proper recording of the next message.

The electrical features of the receiving apparatus are shown in detail in Figures 3 and 4. The apparatus includes a transformer generally indicated at 200 having a center-tapped primary winding 202 and a pair of secondary windings 204 connected in series. The center tap of the primary winding 202 is grounded and the end terminals of the primary winding 202 are connected to the telephone line 107. One terminal of the secondary windings 204 is grounded and another terminal is connected to input terminals of filters 206, 205 and 207.

The filter 206 is provided with characteristics for passing signals at an intermediate frequency of approximately 1,700 cycles and a suitable range of frequencies above and below 1,700 cycles. For example, the filter 206 may be adapted to pass signals in a range of frequencies between approximately 1,500 and 1,900 cycles per second. The output from the filter 206 is applied through a suitable coupling capacitance to the control grid of a suitable tube 208 which may be a type "6AU6." A grid bias resistance 209 having a suitable value such as approximately 47,000 ohms is connected between the control grid of the tube 208 and ground.

Connections are made from the cathode and suppressor grid of the tube 208 to one terminal of a resistance 210 having a suitable value such as approximately 820 ohms, the other terminal of the resistance being grounded. A positive potential is applied to the screen grid of the tube 208 from the common terminal between a pair of resistances 214 and 216, which are in series between a source 212 of direct voltage and ground. The resistances 214 and 216 may respectively have suitable values such as approximately 240,000 and 47,000 ohms.

The plate of the tube 208 has a positive potential applied to it from the source 212 through a resistance 220 having a suitable value such as approximately 330,000 ohms. The voltage on the plate of the tube 208 is applied through a suitable coupling capacitance to the control grid of a tube 222 which also may be a type "6AU6." The control grid of the tube 222 is biased by a resistance 224 having a suitable value such as approximately 1 megohm and extending electrically between the control grid and ground. The cathode and suppressor grid of the tube 222 have a common connection with one terminal of a resistance 226, the other terminal of which is grounded. The resistance 226 may have a suitable value such as approximately 270 ohms. The screen grid of the tube 222 receives a positive potential from the source 212 through a resistance 228 having a suitable value such as approximately 100,000 ohms.

The signals produced on the plate of the tube 222 are applied to one terminal of a primary winding 230, the other terminal of which is connected to receive a positive voltage from the source 212. The primary winding 230 and a center-tapped secondary winding 232 are included in a transformer generally indicated at 234 and forming a part of a frequency discriminator as will be described in detail subsequently. The upper and lower terminals of the secondary winding 232 in Figure 3 are connected to the plates of diodes 236 and 238, which may be included within a single envelope as a type "6AL5."

The cathode of the diode 236 has common connections with first terminals of a capacitance 240 and a resistance 242. In like manner, connections are made from the cathode of the tube 238 to first terminals of a capacitance 244 and a resistance 246. The second terminals of the capacitances 240 and 244 and of the resistances 242 and 246 are connected to the center tap of the secondary winding 232. Each of the capacitances 240 and 244 may have a suitable value such as approximately .020 microfarad, and each of the resistances 242 and 246 may have a suitable value such as approximtely 240,000 ohms.

The cathode of the diode 238 is not only connected to the capacitance 244 and the resistance 246 but is also connected to the cathode of a tube 250. A connection is also made from the cathode of the diode 238 to one terminal of a resistance 252 having a suitable value such as approximately 47,000 ohms and having its second terminal grounded. Positive voltage is applied to the plate of the tube 250 from the source 212. The grid of the tube 250 receives the potential on the movable contact of a potentiometer 254 having a suitable value such as approximately 1 megohm. The movable contact of the potentiometer 254 may be manually adjustable. The stationary contacts of the potentiometer 254 are connected across a capacitance 256 having a suitable value such as approximately .02 microfarad. One stationary contact of the potentiometer 254 and one terminal of the capacitance 256 are grounded.

The ungrounded terminal of the capacitance 256 has a common connection with the cathode of a diode 258, which may be included with a diode 260 in a single envelope designated as a type "6AL5." The plate of the diode 258 and the cathode of the diode 260 are adapted to receive alternating signals through a suitable coupling capacitance 259 from the screen grid of the tube 222. The plate of the diode 260 is grounded.

A resistance 261 and a capacitance 262 are in series between the cathode of the diode 236 and ground. The resistance 260 may have a suitable value such as approximately 10,000 ohms and the capacitance 262 may have a suitable value such as approximately .02 microfarad. The stationary contacts of a potentiometer 264 having a suitable value such as approximately 1 megohm are connected across the capacitance 262. The movable contact of the potentiometer 264 is manually adjustable. The voltage on the movable contact of the potentiometer 264 in Figure 3 is applied through a line 265 (Figures 3 and 4) to the grid of a tube 266 (Figure 4), which may be one-half of a type "12AT7." A positive potential is applied to the plate of the tube 266 from the voltage source 212.

The signals on the cathode of the tube 266 pass to one terminal of a neon tube 270 and to a first stationary contact of a potentiometer 272. The tube 270 may be a type "NE-2" and the potentiometer 272 may have a suitable value such as approximately 100,000 ohms. A suitable negative potential such as approximately —150 volts is applied from the voltage source 212 through a resistance 274 to the second terminal of the neon tube 270 and the second stationary contact of the potentiometer 272. The resistance 274 may have a suitable value such as approximately 91,000 ohms.

The movable contact of the potentiometer 272 is manually adjustable. The voltage on the movable contact of the potentiometer 272 is applied to the grids of tubes 278 and 280 through a resistance 282 having a suitable value such as approximately 100,000 ohms. The tubes 278 and 280 may be included within a single envelope designated as a type "6BL7." A resistance 284 having a suitable value such as approximately 200 ohms is connected at one end to the cathodes of the tubes 278 and 280 and at the other end is grounded.

A capacitance 288 having a suitable value such as approximately 10 microfarads is connected between the cathodes of the tubes 278 and 280 and the movable contact of a single-pole, double-throw switch 290, the upper stationary contact of the switch being grounded. Signals are adapted to be applied to the capacitance 288 from the lower stationary contact of a rheostat 292. Connections are made from the movable contact and the upper stationary contact of the rheostat 292 to the output terminal of a frequency doubler indicated in block form at 293 in Figure 4. The frequency doubler 293 is adapted to receive signals from a source 294 at a frequency such as approximately 60 cycles per second and to convert the signals to a frequency of approximately 120 cycles per second. The source 294 may be any suitable power outlet in a commercial establishment such as a bank, a manufacturing plant or a department store.

Figure 5:
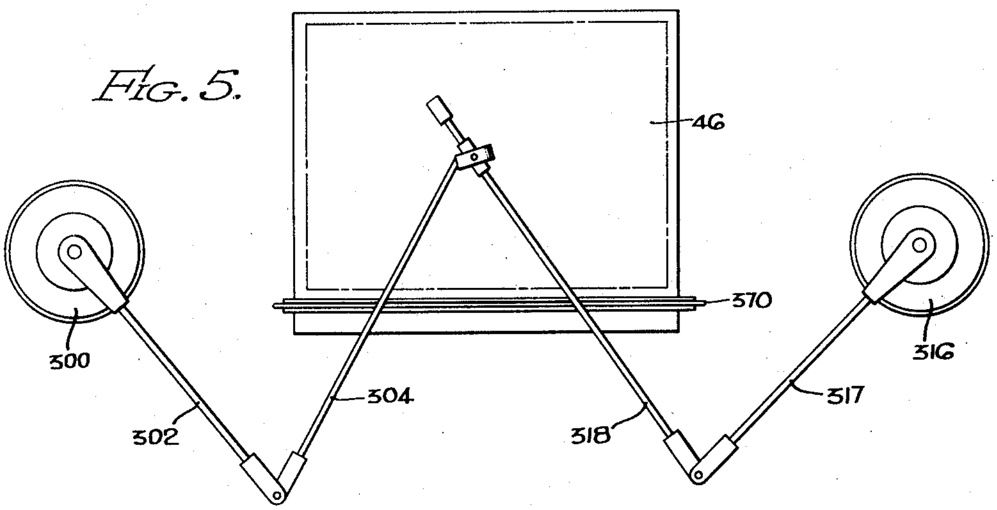
Figure 5 is a plan view somewhat schematically illustrating the construction and relative disposition of certain members operative by the circuitry shown in Figures 3 and 4.

A resistance 296 having a suitable value such as approximately 1.5 megohms has common connections at opposite terminals with the grids and plates of the tubes 278 and 280. Connections are also made from the plates of the tubes 278 and 280 in Figure 4 to one terminal of a motor 300 (also shown in Figure 5), and from the positive terminal of the voltage source 212 to the other terminal of the motor. The motor 300 is adapted to drive the stylus 44 at the receiving station through linkages 302 and 304 (Figure 5). The motor 300 and the linkages 302 and 304 may be constructed in a manner similar to that described for corresponding members in Lauder et al. Patent No. 2,355,087.

Circuitry is associated with the filter 207 (Figure 3) in a manner similar to the circuitry shown in Figures 3 and 4 and described above as being associated with the filter 206. This circuitry includes amplifiers 305 and 306 connected in a cascade arrangement to receive the signals from the filter 207. The amplifiers 305 and 306 may be formed by stages corresponding to those formed by the tubes 208 and 222 and associated circuitry.

The output from the amplifier 306 is adapted to be introduced to a discriminator 307 corresponding substantially to that formed by the transformer 234, the diodes 236 and 238 and their associated circuitry. A connection is made from a particular terminal in the discriminator 307 to the grid of a tube 308 corresponding to the tube 250. The particular terminal in the discriminator 307 corresponds to the cathode of the diode 238 in the circuitry shown at the top of Figure 3. The plate of the tube 308 receives a positive potential from the voltage source. The cathode of the tube has a common connection with one terminal of a resistance 309, the other terminal of which is grounded.

The output from the discriminator 307 passes through a line 310 (Figures 3 and 4) to the grid of a tube 311 (Figure 4) to control the flow of current through the tube. A neon tube 312 and a potentiometer 313 are connected between the cathode of the tube 311 and the grids of tubes 314 and 315 in a manner similar to that described above for the neon tube 270, the potentiometer 272 and the tubes 266 and 278. A resistance 321 corresponding to the resistance 274 receives a negative voltage at one terminal from the voltage source 212 and at the other terminal has a common connection with the neon tube 312 and the potentiometer 313.

The signals produced on the plates of the tubes 314 and 315 are applied to a motor 316 (Figures 4 and 5) corresponding to the motor 300. The motor 316 is coupled to linkages 317 and 318 (Figure 5) to drive the stylus 44 along an axis corresponding to that extending from the lower right corner to the upper left corner of the tablet 20. The motor 316 and the linkages 317 and 318 may be constructed in a manner similar to that described for corresponding members in Lauder et al. Patent No. 2,355,087.

The output from the filter 205 (Figure 3) is introduced through a suitable coupling capacitance to the grid of a tube 319 which may be included with a tube 320 in an envelope designated as a type "12AX7." The grids of the tubes 319 and 320 are respectively biased by resistances 322 and 324 extending electrically between the grids of the tubes and ground. The resistances 322 and 324 may respectively have values of approximately 47,000 and 150,000 ohms. The cathodes of the tubes 319 and 320 have a common connection with one terminal of a resistance 326, the other terminal of which is grounded. The resistance 326 may have a suitable value such as approximately 270 ohms.

A positive voltage is applied from the source 212 directly to the plate of the tube 320. The plate of the tube 319 receives a positive voltage from the source 212 through a resistance 328 having a suitable value such as approximately 240,000 ohms. Signals produced on the plate of the tube 319 are introduced through a suitable coupling capacitance to the grid of a tube 330. The grid of the tube 330 has a bias potential applied to it through a resistance 332 connected between the grid and ground and having a suitable value such as approximately 1 megohm. The cathode of the tube 330 is grounded.

The plate of the tube 330 has a positive potential applied to it through a resistance 334 from the source 212. The resistance 334 may have a suitable value such as approximately 150,000 ohms. The signals on the plate of the tube 330 are introduced through a suitable coupling capacitance 335 to a network formed by resistances 336 and 338 and capacitances 340 and 342. Each of the resistances 336 and 338 may have a suitable value such as approximately 68,000 ohms, and each of the capacitances 340 and 342 may have a suitable value such as approximately 0.02 microfarads.

The capacitances 340 and 342 form a series branch in parallel with a series branch formed by the resistances 336 and 338. A capacitance 344 having a suitable value such as approximately .0039 microfarads extends electrically to ground from the common terminal between the resistances 336 and 338. In like manner, a resistance 346 having a suitable value such as approximately 33,000 ohms extends to ground from the common terminal between the capacitances 340 and 342. The common terminal between the resistance 336 and the capacitance 340 is connected to the grid of the tube 320.

The signals produced on the plate of the tube 330 are also applied through a suitable coupling capacitance 347 and a resistance 348 to the grid of a tube 350. The resistance 348 may be provided with a suitable value such as approximately 1 megohm and the tube 350 may be included with the tube 330 in an envelope designated as a type "12AU7." A resistance 352 having a suitable value such as approximately 680,000 ohms is connected between the grid of the tube 350 and ground. A resistance 354 is also connected at one end to the grid of the tube 350 and at the other end is connected to a suitable terminal in the voltage source 212 for applying a negative potential to the grid. This terminal of the voltage source 212 corresponds to that shown in Figure 4 and described above for applying a negative potential to the resistance 274.

Figure 8:
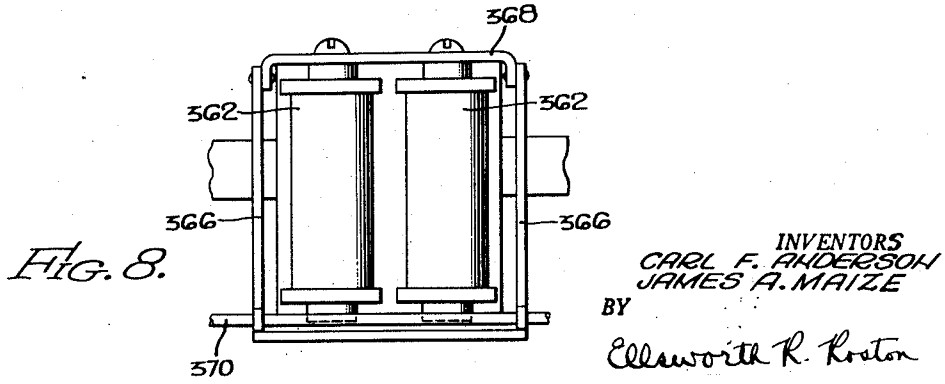
Figure 8 is a sectional view substantially on the line 8—8 of Figure 6 and illustrates in further detail the construction of the solenoid shown in Figures 4, 6 and 7.

The plate of the tube 350 in Figure 3 is connected through a line 357 (Figures 3 and 4) to the movable contact of a single-pole, double-throw switch 358 (Figure 4). The upper stationary contact of the switch 358 in Figure 4 is connected to one terminal of an audio frequency transducer such as a buzzer 360 having its other terminal connected to the source 212 to receive a positive voltage from the source. A solenoid 362 is connected between the lower stationary contact of the switch 358 and the positive terminal of the source 212. The solenoid 362 may be disposed in an inclined plane as best seen in Figures 6 and 7 and may be formed from a pair of parallel coils as best seen in Figure 8.

An armature 364 is associated with the solenoid 362. The armature 364 is supported by arms 366 from a mounting bracket 368 for pivotal movement relative to the bracket. The armature 364 extends from the bracket 368 in oblique relationship to the plane defined by the axes of the two coils forming the solenoid 362. This offset relationship between the armature 364 and the solenoid 362 may be best seen in Figure 7. The purpose of this relationship will be described in detail subsequently.

A support member 370 (Figures 6 and 7) is carried by the arms 366. The support member 370 has a hollow rectangular configuration such that one arm of the rectangle is positioned relatively close to the paper 46 on the same side of the paper as the stylus 44. The member 370 supports the stylus 44 to control the positioning of the stylus relative to the paper 46. The construction of the solenoid 362, the armature 364, the arms 366, the bracket 368 and the support member 370 may be similar to corresponding members described in detail in Lauder et al. Patent 2,355,087.

The switches 290 and 358 are associated in Figure 4 with a relay 374 for actuation when the relay becomes energized. A resistance 375 having a suitable value such as approximately 15,000 ohms is connected between the positive terminal of the source 212 and one terminal of the relay 374. The other terminal of the relay 374 is connected to one stationary contact of a single-pole, double-throw switch 376. The movable contact of the switch 376 is coupled to the motor 316 to become actuated from a second stationary contact to the first stationary contact when the motor is energized. The movable contact of the switch 376 has a common connection with the movable contact of a manually operated single-pole, double-throw switch 378. The lower stationary contact of the switch 378 in Figure 4 is grounded and no electrical connection is made to the upper stationary contact.

A single-pole, double-throw switch 380 is also associated with the relay 374 for actuation when the relay becomes energized. The movable contact of the switch 380 has a common connection with one terminal of the source 294 of alternating voltage. The other terminal of the source 294 is connected to first terminals of a motor 384, a pump 388, a light 390 and a relay 392. The second terminal of the relay 392 has a common connection with the lower stationary contact of the switch 380 in Figure 4.

Switches 394 and 396 are coupled to the relay 392 for actuation when the relay becomes energized. Each of the switches 394 and 396 may be of the single-pole, double-throw type. The movable contact of the switch 394 has a common connection with the upper stationary contact of the switch 380 in Figure 4. No electrical connection is made to the upper stationary contact of the switch 394 in Figure 4. The lower stationary contact of the switch 394 is connected to the second terminals of the motor 384 and the pump 388.

A connection is made from the first terminal of the voltage source 294 in Figure 4 to the movable contact of a single-pole, double-throw cam-operated switch 400. The cam for controlling the operation of the switch 400 is illustrated schematically at 401 in Figure 4 and is formed from an annular lobe portion and a small dwell portion comprising a segment of a circle. The upper stationary contact of the switch 400 in Figure 4 is connected to the second terminals of the motor 384 and the pump 388. The lower stationary contact of the switch 400 has a common connection with the movable contact of the switch 396. No electrical connection is made to the upper terminal of the switch 396 in Figure 4, and the lower terminal of the switch is connected to the second terminal of the light bulb 390.

The signals passing through the telephone line 107 (Figure 3) are introduced to the transformer 200, which provides matching characteristics with the impedance of the telephone line to obtain an optimum transfer of signals. The signals are then introduced from the secondary winding 204 of the transformer 200 to the filter 206. The filter 206 has characteristics for passing signals at an intermediate frequency of approximately 1,700 cycles per second and at frequencies in a range of approximately 200 cycles above and below the intermediate frequency. Actually, the signals passing through the filter 206 are only in the range of approximately 1,650 to 1,750 cycles per second since this represents the maximum frequency range due to traversal of the stylus 18 (Figure 1).

The signals passing through the filter 206 are introduced to the control grid of the tube 208 to produce corresponding variations in the flow of current through the tube. For example, the current through the tube 208 increases when the amplitude of the signals from the filter 206 increases. The current produced in the tube 208 flows through a circuit including the voltage source 212, the resistance 220, the tube 208 and the resistance 210. The current flowing through the resistance 220 produces across the resistance a voltage drop proportional to the current flow. This causes the voltage on the plate of the tube 208 to fall when the signal on the grid of the tube rises. By properly choosing the characteristics of the tube 208 and the electrical components connected to the tube, the tube can be over-driven so that the current through the tube is limited and the voltage on the plate of the tube does not fall when the amplitude of the signals introduced to the grid of the tube increases above a particular value. In this way, the amplifier formed by the tube 208 and the components connected to the tube serves as a limiter to convert the signals passing through the filter 206 into signals having somewhat rectangular wave shapes.

The signals produced on the plate of the tube 208 are introduced to the grid of the tube 222 to produce a corresponding flow of current through the tube. The tube 222 produces on its plate signals inverted in polarity with respect to the signals introduced to the grid of the tube. In this way, the signals produced on the plate of the tube 222 have substantially the same phase as the signals passing to the grid of the tube 208 from the filter 206. The tube 222 is connected in an over-driven relationship in a manner similar to the tube 208 so as to serve as a limiter. By over-driving the tubes 208 and 222, rectangular signals are produced with substantially constant amplitudes which are independent of the amplitudes of the signals introduced to the transformer 200.

The signals on the plate of the tube 222 pass to the primary winding 230 of the discriminating transformer 234. The primary winding 230 is provided with characteristics to form a resonant circuit at an intermediate frequency such as 1,700 cycles per second with the distributed capacitances including the distributed capacitance of the winding. The upper half of the secondary winding 232 in Figure 3 is provided with characteristics to become resonant with the distributed capacitance at a particular frequency greater than the intermediate frequency of 1,700 cycles per second. In like manner, the lower half of the winding 232 in Figure 3 has characteristics for becoming resonant with the distributed capacitance at a frequency less than the intermediate frequency by an amount corresponding to the difference between the intermediate frequency and the resonant frequency of the upper half of the winding 232 in Figure 3. For example, the upper half of the winding 232 in Figure 3 may be resonant with its distributed capacitance at a frequency of approximately 1,730 cycles per second and the lower half of the secondary winding may be resonant at a frequency of approximately 1,670 cycles.

When signals are induced in the secondary winding 232, they cause a positive voltage to be produced in alternate half cycles on the upper terminal of the winding relative to the voltage produced on the center tap of the winding. This causes current to flow through a circuit including the secondary winding, the diode 236 and the capacitance 240. This current charges the capacitance 240 to a value dependent upon the difference in voltage between the voltages on the upper terminal and the center tap of the secondary winding.

In the other half cycles of voltage, the potential on the lower terminal of the winding 232 is greater than the potential on the center tap of the winding. This produces a flow of current through a circuit including the lower half of the winding 232, the diode 238 and the capacitance 244. Because of this current, the capacitance 244 becomes charged to a value dependent upon the amplitude of the signal produced between the lower terminal and the center tap of the winding 232.

When the filter 206 passes the intermediate frequency of 1,700 cycles per second, the resonant circuit formed in part by the upper half of the winding 232 produces signals of the same amplitude as the resonant circuit formed in part by the lower half of the winding. This results from the fact that the upper and lower halves of the winding 232 are resonant at frequencies differing by the same amount from the intermediate frequency of 1,700 cycles per second. Because of the similar reactions of the upper and lower halves of the winding 232, the capacitances 240 and 244 become charged to the same voltages. For this reason, no voltage difference is produced between the cathodes of the tubes 236 and 238. Since a balanced load is produced across the cathodes of the tubes 236 and 238, no output is obtained.

Upon the occurrence of frequencies greater than 1,700 cycles per second, an increase is obtained in the amplitudes of the signals produced in the upper half of the winding 232 with respect to the amplitudes of the signals induced at the intermediate frequency. This results from the fact that the signals more nearly approach the resonant frequency of the resonant circuit formed by the upper half of the winding 232 and the distributed capacitance. In like manner, a decrease is obtained in the amplitude of the signals produced in the lower half of the winding 232, since the frequency is now further removed from the resonant frequency of the circuit formed by the lower half of the winding and the distributed capacitance. Because of the difference in the signals produced in the upper and lower halves of the winding 232, the voltage on the cathode of the tube 236 becomes greater than the voltage on the cathode of the tube 238. This causes a positive voltage to be produced between the cathodes of the tubes 236 and 238.

Similarly, the voltage produced in the lower half of the winding 232 becomes greater than the voltage produced in the upper half of the winding 232 when the frequency of the signals falls below the intermediate value of 1,700 cycles per second. This causes the capacitance 244 to become charged to a greater value than the capacitance 240 such that a voltage of an opposite polarity is produced between the cathodes of the tubes 238 and 236. Since this voltage has an opposite polarity relative to the voltage described in the previous paragraph, it can be considered as a negative voltage.

Since the capacitances 240 and 244 receive charges in accordance with the voltages produced on the upper and lower terminals of the secondary winding 232 in Figure 3, they provide an initial filtering action to convert the alternating signals into a direct voltage. Further filtering action is provided by the resistance 261 and the capacitance 262. Because of this filtering action, the direct voltage produced across the capacitance 262 has an amplitude corresponding to the frequency of the signals passing through the filter 206. The amplitude of the voltage produced across the capacitance 262 is able to vary in accordance with the variations in the frequencies of the signals from the filter 206, since the capacitances 240 and 244 are respectively able to discharge through the resistances 242 and 246.

Because of the parallel relationship of the capacitance 262 and the potentiometer 264, substantially the same voltage is produced across the potentiometer as across the capacitance. A portion of this voltage is introduced through the line 265 in Figures 3 and 4 to the grid of the tube 266 in Figure 4. The portion of the voltage introduced to the grid of the tube 266 can be adjusted by manually varying the positioning of the movable contact in the potentiometer 264 in Figure 3.

The potential introduced to the grid of the tube 266 (Figure 4) produces a flow of current through the tube. The current flows through a circuit including the positive terminal of the voltage source 212, the tube, the neon bulb 270, the resistance 274 and the negative terminal of the voltage source.

When current flows through the neon bulb 270, it produces a constant voltage across the bulb. The voltage across the neon bulb 270 remains constant regardless of changes obtained in the flow of current through the tube 266 by the introduction of variable voltages to the grid of the tube. In this way, the initial positioning of the stylus 44 can be adjusted by varying the positioning of the movable contact of the potentiometer 264 without affecting the response of the stylus to variations in the frequency of the received signals.

Although a constant direct voltage is applied to the grid of the tube 278 to control the initial positioning of the stylus 44, alternating voltages can be introduced to the grid of the tube to vary the positioning of the stylus. These alternating voltages are produced across the resistance 274 to represent the movement of the stylus 18 at the transmitting station. The alternating signals are produced across the resistance 274 by a flow of current through a circuit including the voltage source 212, the tube 266, the neon tube 270 and the resistance 274.

The alternating signal produced across the resistance 274 is introduced to the grids of the tubes 278 and 280 to produce a corresponding flow of current through the tubes. The current flows through a circuit, including the voltage source 212, the motor 300, the tubes 278 and 280 in parallel and the resistance 284. The current flowing through the motor 300 causes the motor to actuate the stylus 44 through a distance proportionally to the flow of current. The stylus is actuated along an axis corresponding to a line extending from the lower right corner to the upper left corner of the paper 46. The stylus 44 is actuated by the motor 300 through the linkages 302 and 304 in Figure 5.

In order to make certain that the stylus 44 is actually free to follow the movements of the stylus 18, an alternating signal is produced by the source 294 at a suitable frequency such as 60 cycles per second. This frequency is converted by the doubler 293 to a suitable frequency such as approximately 120 cycles per second. This frequency is considerably greater than the frequency such as 6 cycles per second which is produced when the stylus 18 is moved to record a message for transmission. A low frequency of 6 cycles per second is produced because a message is generally written by hand.

The signals produced by the doubler 293 are introduced through the capacitance 288 to the cathodes of the tubes 278 and 280 during the time that the movable contact of the switch 290 is engaging the lower stationary contact in Figure 4. As will be described in detail subsequently, this occurs during the time that a message is being transscribed. The signals introduced to the cathodes of the tubes 278 and 280 produce an oscillatory flow of current through the tubes and the motor 300 and cause the motor to be constantly vibrated through a short distance at a high frequency. By vibrating the motor 300 at a high frequency, the bearings of the motor are maintained loose. Since the bearings of the motor 300 are maintained loose, the motor is able to drive the linkages 302 and 304 in Figure 5 for a proper positioning of the stylus 44 in accordance with the movement of the stylus 18.

Because of the flow of current through the tube 222 (Figure 3), a positive potential is produced on the screen grid of the tube. The positive potential produced on the screen grid of the tube 222 varies in accordance with the introduction of alternating signals to the control grid of the tube such that alternating signals are produced on the screen grid. These alternating signals pass through the coupling capacitance 259 to the plate of the diode 258 and the cathode of the diode 260. As previously described, the alternating signals have substantially square wave characteristics because of the over-driven properties provided for the tubes 208 and 222.

In the positive half cycles of voltage from the screen grid of the tube 222, current flows through a circuit including the voltage source 212, the resistance 228, the coupling capacitance 259, the diode 258 and the capacitance 256. This current charges the capacitance 256 to a voltage approaching that introduced to the plate of the diode 258. During the positive half cycles of voltage from the screen grid of the tube 222, current cannot flow through the diode 260 since the voltage on the cathode of the diode 260 is positive with respect to the ground potential on the plate of the diode.

In the negative half cycles of voltage from the screen grid of the tube 222, current cannot flow through the diode 258. This results from the fact that the voltage on the plate of the diode 258 is negative with respect to the positive potential on the cathode of the diode. A negative voltage is also introduced to the cathode of the diode 260. This causes the potential between the cathodes of the diodes 258 and 260 to be approximately twice as great as the amplitude of the signal from the screen grid of the tube 222. The reason for this is that the charge across the capacitance 256 causes a positive potential to be maintained on the cathode of the diode 258 even while the negative signal is being introduced to the cathode of the diode 260.

An adjustable portion of the voltage produced across the capacitance 256 is introduced by the potentiometer 254 to the grid of the tube 250. This voltage produces a corresponding flow of current through the tube 250 and the resistance 252 and a corresponding voltage across the resistance since the tube and resistance serve as a cathode follower. The voltage produced across the resistance 252 is introduced to the cathode of the diode 238 to bias the discriminator formed by the transformer 234, the diodes 236 and 238 and their associated circuitry.

Without the production of a bias on the cathode of the diode 238, an intermediate potential of 0 volts would be produced by the discriminator. This would cause the voltage produced by the discriminator to have a positive or negative polarity in accordance with positive or negative swings from this intermediate potential. The intermediate potential of 0 volt would correspond to an intermediate positioning of the stylus 44 along the axis extending from the lower right corner to the upper left corner of the paper 46. The position of the stylus 44 would then vary from this intermediate position in accordance with the positive or negative potentials produced by the discriminator.

By biasing the discriminator with a positive potential, a shift is obtained in the voltage produced by the discriminator. The bias applied to the discriminator at the cathode of the diode 238 causes an intermediate potential corresponding to the bias voltage to be produced. Because of this positive potential as an intermediate value, the range of potentials produced by the discriminator ranges from 0 volt at one extreme to a voltage approximately twice as great as the bias potential at the other extreme.

Since the discriminator produces a potential of 0 volt at one extreme, the initial position of the stylus 44 can be considered to be at the lower left corner of the axis extending from the lower left corner to the upper right corner of the paper 46. The position of the stylus 44 varies from this extreme position in accordance with the amplitude of the positive potential produced by the discriminator.

A positive bias is produced by the discriminator only during the time that a message is being transcribed by the stylus 18 at the transmitting station. This results from the fact that alternating signals are produced on the screen grid of the tube 222 only to represent the movements of the stylus 18 along an axis extending from the lower right corner of the tablet 20 to the upper left corner of the tablet. When no message is being transcribed, no alternating signals are produced by the tube 222 for introduction to the diodes 258 and 260. This prevents a bias potential from being produced for introduction to the cathode of the the diode 238. In this way, the initial positioning of the stylus 44 at an extreme position along one axis is obtained only during the transcribing of a message at the transmitting station.

In like manner, the filter 207 in Figure 3 passes signals only at a frequency of 2,300 cycles per second and in a moderate range above and below this frequency. These signals represent movements of the stylus 18 along an axis extending from the lower left corner to the upper right corner of the tablet 20. The signals passing through the filter 207 are introduced to the amplifier 305 formed from members similar to the tube 208 and the resistance and capacitators associated with the tube. The amplifier 305 is over-driven in a manner similar to that described above for the amplifier including the tube 208, so that the amplifier serves somewhat as a limiter to produce a square wave signal. The signals from the amplifier 305 then pass to the amplifier 306, which is over-driven so as to insure the production of the square wave signals. The amplifier 306 may be formed from a tube and associated resistances and capacitors in a manner similar to that described above for the tube 222 and its associated components.

The discriminator 307 receives the alternating signals from the amplifier 306 and converts the alternating signals into a direct signal having an amplitude related to the frequency of the alternating signals. For example, the discriminator does not produce a direct signal when the signals have a frequency of approximately 2,300 cycles per second. In the absence of bias from the cathode follower 308, 309, the discriminator 307 produces a direct voltage of a positive polarity when the signals have a frequency greater than 2,300 cycles per second and produces a direct voltage of the opposite polarity when the signals have a frequency below 2,300 cycles per second. The voltage doubler coupled to the output of the amplifier 306 produces a bias voltage derived from the cathode resistor 309 which causes the discriminator output to always be of one polarity, as described above.

The signals from the discriminator 307 pass through the line 310 (Figures 3 and 4) to the cathode follower formed in part by the tube 311. The signals produce a flow of current through a circuit including the positive terminal of the voltage source 212, the tube 311, the neon bulb 312, the resistance 321 and the negative terminal of the source 212. A constant voltage is developed across the bulb 312 by the flow of current through the bulb regardless of the intensity of the current.

This constant voltage across the bulb 312 causes a stable voltage to be produced on the movable contact of the potentiometer 313 for a given positioning of the movable contact. Since this potential can be varied by adjusting the positioning of the movable contact in the potentiometer 313, a corresponding adjustment can be obtained in the initial positioning of the stylus 44.

The alternating signals introduced to the grid of the tube 311 cause an alternatng current to flow through the resistance 321 and an alternating voltage to be produced across the resistance. This alternating voltage is introduced to the grids of the tubes 314 and 315 to produce a flow of alternating current through the tubes. The current through the tubes 314 and 315 also flows through the motor 316 and causes the motor to produce a movement of the stylus 44 corresponding to the variation in the amplitude of the signals. The motor 316 drives the stylus 44 through the linkages 317 and 318 in Figure 5.

The alternating signals produced in the motor 316 occur at a relatively low frequency such as 6 cycles per second in accordance with the manual movements of the stylus 18. Signals at a relatively high frequency such as 120 cycles per second are also produced in the motor 316 by the introduction of signals from the frequency doubler 293. These signals shake the motor bearings free so that the motor can drive the linkages 317 and 318 easily through distances corresponding at any instant to the disposition of the stylus 18.

The filter 205 in Figure 3 is provided with characteristics to pass signals only at a frequency of approximately 1,300 cycles per second only during the time that a message is not being recorded at the transmitting station by the stylus 18. The signals passing through the filter 205 are introduced to the grid of the tube 319 to control the flow of current through a circuit including the voltage source 212, the resistance 328, the tube 319 and the resistance 326. The current flowing through the resistance 326 produces a voltage drop across the resistance and causes the voltage on the plate of the tube 319 to fall during the time that the amplitude of the signal introduced to the grid of the tube is rising. In this way, the signal produced on the plate of the tube 319 is substantially 180° out of phase with the signals introduced to the grid of the tube.

The alternating signals produced on the plate of the tube 319 pass to the grid of the tube 330 to control the flow of current through a circuit including the voltage source 212, the resistance 334 and the tube 330. Because of the voltage drop across the resistance 334, the alternating signals produced on the plate of the tube 330 are substantially 180° out of phase with the signals introduced to the grid of the tube. This causes the signals produced on the plate of the tube 330 to be substantially in phase with the signals introduced to the grid of the tube 319.

The signals produced on the plate of the tube 330 are shifted by at least 90° in phase by the network formed by the resistances 336, 338 and 346 and the capacitances 340, 342 and 344. Preferably the signals are shifted in phase by the phase shifting network through an angle approaching 180°. After being shifted in phase, the signals are introduced to the grid of the tube 320. In this way, the signals introduced to the grid of the tube 320 are approximately 180° out of phase with respect to the signals introduced to the grid of the tube 319. Because of this phase relationship, a relatively large current flows through a circuit including the voltage source 212, the tube 320 and the resistance 326 at the time that a relatively small current flows through the tube 319.

The relatively large flow of current through the tube 320 and the resistance 326 causes a relatively high voltage to be produced on the cathodes of the tubes 319 and 320. This voltage pushes the tube 319 toward a state of nonconductivity at the time that the alternating signal introduced to the grid of the tube has a negative polarity. By pushing the tube 319 toward cut-off, the tube 320 operates to accentuate the effect of the signals introduced to the grid of the tube 319 so that relatively sharp signals are produced on the plate of the tube 319. These signals in turn cause relatively sharp signals to be produced on the plate of the tube 330.

The signals produced on the plate of the tube 330 are introduced to the grid of the tube 350 to control the flow of current through the latter tube. Since the tube 350 is negatively biased against the flow of current, current can flow through the tube only upon the introduction of alternating signals from the plate of the tube 330 and only during the positive half of such alternating signals. In the positive half of such alternating signals, current flows through a circuit including the voltage source 212, the solenoid 362 (Figure 4), the lower stationary and movable contacts of the switch 358, the line 357 in Figures 3 and 4 and the tube 350 (Figure 3). As will be described in detail subsequently, the movable contact of the switch 358 engages the lower stationary contact of the switch in Figure 4 when a message is being transcribed.

Upon a flow of current through the solenoid 362 (Figure 4), the solenoid becomes energized so as to actuate the armature 364 into the position shown in Figure 6. The actuation of the armature 364 produces a pivotable movement of the arms 366 in a clockwise direction; the arms 366 in turn carry the support member 370 in a clockwise direction such that the support member moves the stylus 44 away from the paper 46. In this position, the stylus 44 cannot record any marks on the paper 46.

As previously described, the solenoid 362 can become energized only when the movable contact of the switch 358 is moved into engagement with the lower stationary contact of the switch in Figure 4. This occurs only when a message is being transcribed by the stylus 18, as represented by a flow of current through the motor 316 in a manner similar to that described above. When current flows through the motor 316, the motor actuates the movable contact of the switch 376 to produce an engagement between the movable contact and the left stationary contact in Figure 4. This causes current to flow through a circuit including the voltage source 212, the resistance 375, the relay 374, the left stationary and movable contacts of the switch 376 and the movable and lower stationary contacts of the switch 378 in Figure 4. Current can flow through this circuit only upon a manual operation of the switch 378 to produce electrical continuity between the movable and lower stationary contacts of the switch in Figure 4.

Upon a flow of current through the relay 374, the movable contact of the switch 358 becomes pivoted into engagement with the lower stationary contact of the switch to make possible the flow of current through a circuit including the solenoid 362 as described fully above. The movable contact of the switch 290 is also pivoted into engagement with the lower stationary contact of the switch upon a flow of current through the relay 374. This causes the ground potential on the capacitance 288 to be removed. By removing the ground potential from the capacitance 288, signals at a relatively high frequency such as approximately 120 cycles per second can be applied to the motor 300 to shake the motor bearings free for an accurate movement of the stylus 44. The motor 316 is shaken in a similar manner to produce an accurate movement of the stylus 44 in accordance with the current flowing through the motor.

The movable contact of the switch 380 is also mechanically coupled to the relay 374 so as to be pivoted into engagement with the lower stationary contact of the switch when the relay is energized. This produces a flow of current through a circuit including the voltage source 294, the movable and lower stationary contacts of the switch 380 and the relay 392. When the relay 392 becomes energized, it actuates the movable contacts of the switches 394 and 396 into engagement with the lower stationary contacts of the switches.

After a message has been transcribed by the stylus 44 on the paper 46 (Figures 6 and 7), current no longer flows through the motor 316. This causes the movable contact of the switch 376 in Figure 4 to return into engagement with the right stationary contact of the switch such that the current flowing through the relay 374 becomes interrupted. Because of the interruption in the current through the relay 374, the movable contacts of the switches 290, 358 and 380 pivot into engagement with the upper stationary contacts of the switches in Figure 4.

Upon an engagement between the movable and upper stationary contacts of the switch 358 in Figure 4, a continuous circuit is established which includes the voltage source 212, the buzzer 360, the switch 358, the line 357 (Figures 3 and 4) and the tube 350 (Figure 3), when the transmitter signal switch 120 is pressed in Figure 1 to pivot the movable contact of the switch into engagement with the upper stationary contact of the switch. The resultant flow of current through this circuit energizes the buzzer 360 so that the buzzer produces a noise. This noise provides an indication to people in the vicinity that a message has been transmitted and has been recorded on the paper 46 by the stylus 44.

When the movable contact of the switch 380 pivots into engagement with the upper stationary contact of the switch in Figure 4, the continuous circuit through the relay 392 becomes interrupted. However, the movable contacts of the switches 394 and 396 do not instantaneously return into engagement with the upper stationary contacts of the switches since delays are provided in the reaction of the movable contacts. Because of the delay in the reaction of the switches 394 and 396, a continuous circuit is established which includes the voltage source 294, the motor 384, the lower stationary and movable contacts of the switch 394 and the upper stationary and movable contacts of the switch 380. This continuous circuit causes the motor 384 to become energized.

Upon becoming energized, the motor 384 unwinds a roll of paper 46 so that a new area of paper can be positioned below the stylus 44 to obtain a fresh recording of a new message. As the motor 384 starts to operate, it drives the cam 401 which controls the operation of the switch 400. The cam 401 has a dwell portion extending through a small angular distance along the periphery of the cam and also has a lobe portion extending around the remainder of the periphery of the cam. Because of this, the motor 384 drives the cam 401 from the dwell portion to the lobe portion during the instant of delay in which the movable contacts of the switches 394 and 396 engage the upper stationary contacts of the switches after the relay 392 has become de-energized.

A holding circuit is established when the motor 384 has driven its associated cam 401 from the dwell portion to the lobe portion of the cam. This results from the fact that the lobe portion of the cam 401 actuates the movable contact of the switch 400 into engagement with the upper stationary contact of the switch in Figure 4. A holding circuit is then established which includes the voltage source 294, the movable and upper stationary contacts of the switch 400 and the motor 384.

The holding circuit through the motor 384 is maintained while the motor drives the cam 401 through substantially one complete revolution. After the cam 401 has rotated through substantially one complete revolution, the movable contact of the switch 400 engages the dwell portion of the cam so as to pivot into engagement with the lower stationary contact of the switch in Figure 4. Since the holding circuit through the motor 384 becomes interrupted upon the engagement between the movable and lower stationary contacts of the switch 400, the motor 384 does not operate any longer. The operation of the motor 384 becomes interrupted after a new area of paper 46 has been moved to a position below the stylus 44.

Since the pump 388 is in parallel with the motor 384, the pump becomes energized at the same time as the motor. The pump includes a solenoid and an armature movable on a reciprocating basis when the solenoid becomes energized. The armature in turn carries a plunger which drives ink from a well into a position for use by the stylus 44. In this way, ink is made available for a next message every time that ink has been used for a previous message. The pump 388 can be constructed in a manner similar to that disclosed in Lauder Patent No. 2,355,087.

As previously described, the movable contacts of the switches 394 and 396 engage the lower stationary contacts of the switches when the relay 392 is energized. During this time, a continuous circuit is established which includes the voltage source 294, the movable and lower stationary contacts of the switch 400, the movable and lower stationary contacts of the switch 396 and the lamp 390. This causes the lamp 390 to become energized and remain energized during the period when a message is being received. The lamp 390 becomes extinguished at the end of the time that the paper 46 becomes shifted by the motor 384 and at the end of the time that the ink becomes pumped into position for use by the stylus 44. This results from the fact that the movable contact of the switch 400 has returned into engagement with the lower stationary contact of the switch in Figure 4 and that the movable contacts of the switches 394 and 396 have returned into engagement with the upper stationary contacts of the switches.

The apparatus described above has several important advantages. It produces signals which are frequency modulated to represent the movements of a stylus at a transmitting station. The apparatus then transmits the signals through lines such as telephone lines and decodes the signals at a receiving station to produce movements of a stylus at the receiving station in accordance with the movements of the stylus at the transmitting station. In this way, messages transcribed at the transmitting station can be automatically and reliably recorded at the receiving station.

The apparatus constituting this invention has certain other important advantages. During the transcribing of a message at the transmitting station, the apparatus produces a biasing voltage at the receiving station. This biasing voltage is used to initially position the receiving stylus at an extreme position along the axes of stylus movement. In this way, the stylus can move initially only in one direction along this axis. Furthermore, all of the signals which are produced have only one polarity. The production of the biasing voltage is further advantageous in that it is obtained only during the time that a message is being transcribed at the transmitting station.

Another advantage results from the fact that the stylus at the receiving station can be adjusted in position without affecting its response to alternating signals. This advantage is obtained by the inclusion of certain circuitry such as the tube 266, the neon bulb 270 and the potentiometer 272. By using such circuitry, a stable direct voltage is introduced to the grids of the tubes 278 and 280 from the potentiometer 272 to control the initial positioning of the stylus 44. Alternating signals are independently produced across the resistance 274 for introduction to the grids of the tubes 278 and 280 to obtain the recording of a message by the stylus 44.

The apparatus constituting this invention is further advantageous in the manner in which it controls the positioning of the stylus 44 relative to the paper 46. This advantage is obtained by normally positioning the stylus 44 in contact with the paper 46. When signals at a particular frequency such as 1,300 cycles per second are transmitted, the solenoid 362 is energized to lift the stylus 44 away from the paper 46. This prevents the stylus 44 from recording any messages on the paper 46 only upon the occurrence of the signals at a particular frequency such as 1,300 cycles per second.

Although this invention has been disclosed and illustrated with reference to particular applications, the principles involves are susceptible of numerous other applications which will be apparent to persons skilled in the art. The invention is, therefore, to be limited only as indicated by the scope of the appended claims.

What is claimed is:

1. In combination, means for providing signals having a particular frequency to represent an intermediate position of a first stylus and having frequencies variable from the particular value in accordance with the displacement of the stylus from the intermediate position, means for transmitting the signals, means at a removed position for receiving the transmitted signals, a discriminator for providing signals having an amplitude and polarity related to the variations in the frequency of the transmitted signals from the particular value, and means for using the received signals to bias the discriminator for a shift in the signals from the discriminator to a range representing a zero amplitude for an initial positioning of the stylus at one extremity of its effective range of movements and representing increasing amplitudes for progressive movements of the stylus from this initial positioning.

2. In combination, means for providing signals having a particular frequency to represent an initial position of a first stylus and for varying the frequency of the signals in accordance with the displacement of the stylus from the initial position, means for providing for the transmission of the signals, means at a removed position for receiving the transmitted signals, means for providing a discrimination of the received signals to obtain signals having an amplitude related to the variance of the first signals from the particular frequency, means for providing a movement of a second stylus in accordance with the amplitude of the discriminated signals, and means responsive to the presence of received signals to provide a bias for the discriminating means.

3. In combination with a stylus at a transmitting station, means for providing alternating signals having a particular frequency to represent an initial positioning of the first stylus and having frequencies variable from the particular frequency in accordance with displacements of the stylus from the initial position, means for providing for the transmission of the alternating signals, means for providing for the reception of the alternating signals at a receiving station, a stylus at the receiving station, means for decoding the received signals to provide variable voltage signals having an amplitude related at any instant to the frequency of the transmitted signals, control means including means for providing a constant voltage regardless of the intensity of the current flowing through the control means and means for adjusting the amplitude of said constant voltage, means connected in a circuit with the control means for summing the constant voltage of the control means with the variable voltage signals, and means connected in a circuit with the last mentioned means and the adjustable means and associated with the receiving stylus for obtaining a positioning of the stylus in accordance with the combined signals from the last mentioned means and the adjustable means.

4. In combination with a stylus at a transmitting station, means for providing alternating signals having a particular frequency to represent an initial positioning of the first stylus and having frequencies variable from the particular frequency in accordance with the displacements of the stylus from the initial position, means for providing for the transmission of the alternating signals, means for providing for the reception of the alternating signals at a receiving station, means for providing for a discrimination of the received signals to obtain a voltage having an amplitude related to the frequency of the received signals, a stylus at the receiving station, means for detecting the alternating signals to provide a bias voltage and for introducing the bias voltage to the discriminator to bias the discriminator for a movement of the stylus from an extreme position in accordance with the amplitude of the detected signals, and means for adjusting the initial positioning of the stylus at the receiving station without affecting the response of the stylus to variations in the amplitude of the detected signals.

5. Telescribing apparatus comprising means for generating alternating signals having frequencies indicative of the position of a first movable member, means for reproducing said signals at a remote position, discriminator means at the remote position coupled to said reproducing means for generating D.C. signals whose amplitudes are indicative of the position of the first movable member, means for positioning a second movable member in response to said D.C. signals, means responsive to said alternating signals at the remote position for producing D.C. bias voltages in response thereto, and means for applying said bias voltages to the discriminator means, whereby the voltage levels at the output of the discriminator means are changed by the presence or absence of alternating signals received at the remote position.

References Cited in the file of this patent

UNITED STATES PATENTS

| | | |
|---|---|---|
| 2,274,638 | Rosene | Mar. 3, 1942 |
| 2,455,617 | Shepard | Dec. 7, 1948 |
| 2,462,904 | Rosen | Mar. 1, 1949 |
| 2,583,720 | Adler | Jan. 29, 1952 |
| 2,621,249 | Ress | Dec. 9, 1952 |